United States Patent
Konrad et al.

(10) Patent No.: US 7,670,667 B2
(45) Date of Patent: Mar. 2, 2010

(54) BIAXIALLY ORIENTED POLYESTER FILM WHICH COMPRISES SILICON DIOXIDE AND TITANIUM DIOXIDE

(75) Inventors: Matthias Konrad, Hofheim (DE); Martin Jesberger, Mainz (DE); Bodo Kuhmann, Runkel (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 919 days.

(21) Appl. No.: 11/285,417

(22) Filed: Nov. 22, 2005

(65) Prior Publication Data

US 2006/0134383 A1     Jun. 22, 2006

(30) Foreign Application Priority Data

Dec. 21, 2004   (DE) ................... 10 2004 061 389

(51) Int. Cl.
*B32B 27/18*  (2006.01)
*B32B 27/20*  (2006.01)
*B32B 27/36*  (2006.01)

(52) U.S. Cl. .............. 428/141; 428/323; 428/328; 428/330; 428/331; 428/480; 428/910; 524/847; 528/308; 528/308.1; 528/308.6

(58) Field of Classification Search ............ None
See application file for complete search history.

(56) References Cited

U.S. PATENT DOCUMENTS

| | | | |
|---|---|---|---|
| 3,154,461 A | 10/1964 | Johnson ............... 161/116 |
| 4,274,025 A | 6/1981 | Nerurkar et al. ............ 310/215 |
| 4,818,581 A * | 4/1989 | Katoh et al. ............... 428/143 |
| 4,952,449 A * | 8/1990 | Okazaki et al. ............ 428/147 |
| 4,990,400 A * | 2/1991 | Endo et al. ............... 428/331 |
| 5,106,681 A * | 4/1992 | Endo et al. ............... 428/323 |
| 5,403,879 A | 4/1995 | Kim et al. ............... 524/161 |
| 6,231,955 B1 * | 5/2001 | Endo ............... 428/215 |
| 6,261,663 B1 * | 7/2001 | Peiffer et al. ............ 428/141 |
| 6,291,053 B1 * | 9/2001 | Peiffer et al. ............ 428/141 |
| 6,376,042 B1 * | 4/2002 | Peiffer et al. ............ 428/141 |
| 6,528,144 B2 * | 3/2003 | Peiffer et al. ............ 428/141 |
| 6,627,295 B2 * | 9/2003 | Peiffer et al. ............ 428/141 |
| 6,630,224 B2 * | 10/2003 | Peiffer et al. ............ 428/141 |
| 2002/0160171 A1 * | 10/2002 | Peiffer et al. ............ 428/220 |
| 2004/0146724 A1 * | 7/2004 | Peiffer et al. ............ 428/458 |

FOREIGN PATENT DOCUMENTS

| | | |
|---|---|---|
| EP | 0 152 265 A2 | 8/1985 |
| EP | 0 723 565 A1 | 7/1996 |
| EP | 1 197 326 A2 | 4/2002 |
| EP | 1 197 327 A1 | 4/2002 |
| EP | 1 234 848 A1 | 8/2002 |
| EP | 1 442 875 A1 | 8/2004 |
| JP | 62 241928 | 10/1987 |
| JP | 62165494 | 1/1989 |
| WO | WO 95/10563 | * 4/1995 |

* cited by examiner

*Primary Examiner*—Vivian Chen
(74) *Attorney, Agent, or Firm*—ProPat, L.L.C.

(57) ABSTRACT

The invention relates to a biaxially oriented polyester film having at least one base layer (B) which includes from 0.25 to <1.0% by weight of $SiO_2$ and from 0.25 to <1.0% by weight of $TiO_2$. The invention further relates to a process for the production of the film and to its use. The inventive film features characteristic surfaces and defined optical properties, and has good suitability for use in the industrial sector.

17 Claims, 1 Drawing Sheet

US 7,670,667 B2

BIAXIALLY ORIENTED POLYESTER FILM WHICH COMPRISES SILICON DIOXIDE AND TITANIUM DIOXIDE

CROSS-REFERENCE TO RELATED APPLICATIONS

This application claims priority to parent German Patent Application No. 10 2004 061 389.3, filed Dec. 21, 2004, hereby incorporated by reference herein in its entirety.

FIELD OF THE INVENTION

The invention relates to a biaxially oriented polyester film comprised of at least one base layer (B) which comprises from 0.25 to <1.0% by weight of $SiO_2$ and from 0.25 to <1.0% by weight of $TiO_2$. The invention further relates to a process for the production of the film and to its use.

The inventive film features characteristic surfaces and defined optical properties, and has good suitability for use in the industrial sector.

BACKGROUND OF THE INVENTION

There is a high level of industrial demand for plastics films, e.g. biaxially oriented films comprised of polypropylene or of polyester and having defined surfaces and optical properties. Films with uniform, moderate surface roughness are of interest in specific applications.

U.S. Pat. No. 3,154,461 claims a process for production of a biaxially oriented film comprised of thermoplastic (e.g. polyethylene terephthalate, polypropylene) with a matt surface, in which the film comprises non-compressible particles (e.g. calcium carbonate, silicon dioxide) whose size is from 0.3 to 20 µm and whose concentration is from 1 to 25% by weight. That application also claims the matt film produced by the inventive process. The film produced by the inventive process is too rough for many applications.

EP-A-1 197 326 describes a matt, biaxially oriented polyester film which comprises from 1 to 10% by weight of particles whose average particle size is from 2 to 5 µm. The average roughness $R_a$ of these films is in the range from 150 to 1000 µm. No statements are made concerning the uniformity of roughness or the height of the highest elevations.

EP-B-0 152 265 describes a polyester film which comprises from 0.01 to 1.0% by weight of silicon dioxide and/or titanium dioxide whose average particle size is from 0.01 to 0.5 µm and from 0.02 to 0.5% by weight of calcium carbonate whose average particle size is from 0.04 to 0.48 µm. The small particles give this film very low roughness, but no statements are made concerning transparency.

JP-A-62 241928 describes a film which comprises titanium dioxide, silicon dioxide, and an optical brightener. The concentration of the titanium dioxide is in the range from 8 to 20% by weight, giving the film very low transparency.

EP-A-0 723 565 claims a polyester film which comprises from 1 to 20% by weight of titanium dioxide and from 0.1 to 6% by weight of mica whose average particle size is from 3 to 40 µm. The large amount of titanium dioxide gives excessively low transparency.

U.S. Pat. No. 5,403,879 claims a polyester film which comprises from 5 to 25% by weight of titanium dioxide, from 0.1 to 3% by weight of silica whose average particle size is from 1 to 5 µm, and from 0.02 to 1.0% by weight of a fluorescent organic pigment. The high concentration of titanium dioxide gives the film very low transparency. The examples mention films whose transparency is smaller than 2%, at a film thickness of 188 µm.

SUMMARY OF ADVANTAGEOUS EMBODIMENTS OF THE INVENTION

It was an object of the present invention to provide a biaxially oriented polyester film which has uniformly low roughness and defined optical properties. In particular, the transparency of the film should be in the range from 30 to 90%. The structure of the surface is to give the film good processability and coatability. There are to be no high peaks ($R_p$ above 4 µm) present. These would cause coating defects. Films of this type are needed, by way of example, in applications in which the surface topography of the film is transferred to a substrate, and specifically when the film is coated with a release layer which remains adhering to the substrate.

DETAILED DESCRIPTION OF THE INVENTION

Figure 1:
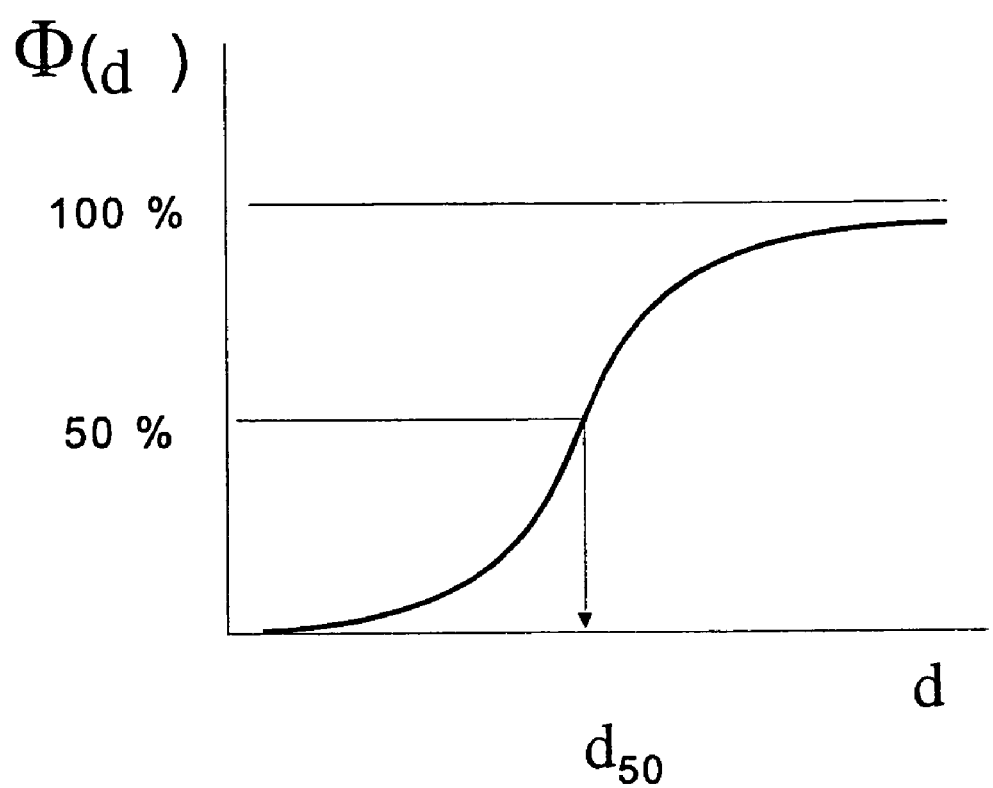
FIG. 1 is an exemplary cumulative particle size distribution curve.

According to the invention, the object is achieved via a biaxially oriented polyester film with at least one matt base layer (B) which comprises silicone dioxide to generate the surface roughness and titanium dioxide to adjust transparency. The concentration of the two fillers is in each case from 0.25 to <1.0% by weight, preferably from 0.3 to 0.95% by weight, particularly preferably from 0.35 to 0.9% by weight, based on the total weight of the film. Roughness values and transparency values lying within the desired range are achieved for films of different thickness via appropriate variation of the concentration of the two fillers.

The inventive film preferably has the following properties:
The highest elevation on the film ($R_p$) is smaller than 4.0 µm, preferably smaller than 3.5 µm, and particularly preferably smaller than 3.0 µm.
The size of the $SiO_2$ particles is from 0.5 µm to 3.0 µm, preferably from 1.0 µm to 2.8 µm, and particularly preferably from 1.5 µm to 2.5 µm ($d_{50}$). The silicon dioxide is preferably amorphous silica. The dimensions of the $SiO_2$ particles should be approximately equal in all spatial directions, i.e. the ratio of length to width to height should be close to 1:1:1, preferably (0.9-1.1):(0.9-1.1):1.
The transparency of the film is in the range from 30 to 90%, preferably from 40 to 80%, and particularly preferably from 50 to 70%.
The titanium dioxide can either be of rutile type or else of anatase type. The grain size of the titanium dioxide is preferably from 0.02 to 0.6 µm, preferably from 0.05 to 0.5 µm, and particularly preferably from 0.1 to 0.4 µm.
The number of elevations higher than 0.1 µm on the surface of the film is from 800 to 10 000 per $mm^2$, preferably from 1000 to 7500 per $mm^2$, and particularly preferably from 1200 per $mm^2$ to 5000 per $mm^2$.
The gloss of the film, measured at 60°, is from 20 to 100, preferably from 30 to 85, and particularly preferably from 40 to 70.

According to the invention, the film preferably has a single-layer structure and in this case encompasses the base layer (B) as sole layer.

The base layer (B) of the film preferably comprises at least 70% by weight of thermoplastic polyester.

Materials suitable for this purpose are polyesters comprised of ethylene glycol and terephthalic acid (=polyethylene terephthalate, PET), comprised of ethylene glycol and naphthalene-2,6-dicarboxylic acid (=polyethylene 2,6-naphthalate, PEN), comprised of 1,4-bishydroxymethylcyclohexane and terephthalic acid [=poly(1,4-cyclohexanedimethylene terephthalate), PCDT], or else comprised of ethylene glycol, naphthalene-2,6-dicarboxylic acid and biphenyl-4,4'-dicarboxylic acid (=polyethylene 2,6-naphthalate bibenzoate, PENBB). Preference is given to polyesters comprised of at least 90 mol %, particularly preferably at least 95 mol %, of ethylene glycol units and terephthalic acid units, or of ethylene glycol units and naphthalene-2,6-dicarboxylic acid units. In one very particularly preferred embodiment, the base layer is comprised of polyethylene terephthalate homopolymer.

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalenedicarboxylic acids, such as naphthalene-1,4- or -1,6-dicarboxylic acid, biphenyl-x,x'-dicarboxylic acids, in particular biphenyl-4,4'-dicarboxylic acid, diphenylacetylene-x,x'-dicarboxylic acids, in particular diphenylacetylene-4,4'-dicarboxylic acid, or stilbene-x,x'-dicarboxylic acids.

Among the cycloaliphatic dicarboxylic acids mention should be made of cyclohexanedicarboxylic acids, in particular cyclohexane-1,4-dicarboxylic acid. Among the aliphatic dicarboxylic acids, the ($C_3$-$C_{19}$) alkane-diacids are particularly suitable, and the alkane moiety here may be straight-chain or branched.

The additional layers (intermediate layers or outer layers) which may be present in the film are likewise preferably comprised of the type of polyester described above for the base layer, and the constitution here may be identical with or different from that of the base layer.

By way of example, the transesterification process may be used to prepare the polyesters. This process begins from dicarboxylic esters and diols, these being reacted with use of the conventional transesterification catalysts, such as the salts of zinc, of calcium, of lithium, of magnesium, and of manganese. The intermediates are then polycondensed in the presence of well-known polycondensation catalysts, such as antimony trioxide or titanium salts. Another equally good preparation method is the direct esterification process in the presence of polycondensation catalysts. This begins directly from the dicarboxylic acids and the diols.

The film according to the invention comprises both $SiO_2$ particles and $TiO_2$ particles to generate the desired surface properties and optical properties.

The amount of the $SiO_2$ particles present in the film is from 0.25 to <1.0% by weight, preferably from 0.3 to 0.95% by weight, particularly preferably from 0.35 to 0.9% by weight (based on the total weight of the film). If the film has two or more layers, the stated amount of $SiO_2$ particles is present at least in one external layer. If the amount present is less than 0.25% by weight, there are too few elevations on the surface of the film. If 1.0% by weight or more than 1.0% by weight is present, the surface becomes inhomogeneous, because particles at the surface are pressed upward by particles situated under the surface. The average particle size of the $SiO_2$ particles is preferably from 0.5 to 3.0 µm, preferably from 1 to 2.8 µm, and particularly preferably from 1.5 to 2.5 µm ($d_{50}$). If the size of the particles is greater than 3.0 µm, the elevations are too high, and they cause coating defects. The dimensions of the $SiO_2$ particles should be approximately equal in all spatial directions, i.e. the ratio of length to width to height should be close to 1:1:1, preferably (0.9-1.1):(0.9-1.1):1. The silicon dioxide particles used preferably comprise amorphous silica particles.

The amount of the $TiO_2$ particles in the film is likewise from 0.25 to <1.0% by weight, preferably from 0.3 to 0.95% by weight, particularly preferably from 0.35 to 0.9% by weight (based on the total weight of the film, even if the film has two or more layers). If the amount present is less than 0.25% by weight, transparency is too high. If the amount present is 1.0% by weight or more than 1.0% by weight, transparency is too low. The average particle size ($d_{50}$) of the $TiO_2$ particles is preferably from 0.02 to 0.6 µm, preferably from 0.05 to 0.5 µm, and particularly preferably from 0.1 to 0.4 µm. If the particles are smaller than 0.02 µm, agglomerates are readily formed. If the size of the particles is greater than 0.6 µm, they affect the roughness. The titanium dioxide particles may be either of rutile type or else of anatase type.

The effect of the combination of the $SiO_2$ particles and $TiO_2$ particles is that the highest elevation on the film ($R_p$) is smaller than or equal to 4.0 µm, preferably smaller than or equal to 3.5 µm, and particularly preferably smaller than or equal to 3.0 µm. If it is greater than 4.0 µm, these peaks penetrate a coating applied in a subsequent step of processing. The total number of elevations higher than 0.1 µm on the surface of the film is from 800 to 10 000 per $mm^2$, preferably from 1000 to 7500 per $mm^2$, and particularly preferably from 1200 per $mm^2$ to 5000 per $mm^2$. Processing problems are encountered if it is smaller than 800 per $mm^2$.

Another effect of the combination of the $SiO_2$ particles and $TiO_2$ particles is that the transparency of the film is from 30 to 90%, preferably from 40 to 80%, and particularly preferably from 50 to 70%.

The base layer (B) can also comprise conventional additives, such as examples of stabilizers, alongside the $SiO_2$ particles and $TiO_2$ particles. Examples of stabilizers advantageously used are phosphorus compounds, such as phosphoric acid or phosphoric esters. The inventive film preferably comprises no further particles which affect the surface properties and/or optical properties of the film, e.g. $CaCO_3$ particles.

The thickness of the inventive polyester film can vary within certain limits. It is advantageously in the range from 10 to 350 µm, in particular from 15 to 300 µm, preferably from 20 to 250 µm.

Production Process:

The invention also provides a process for production of the inventive polyester film by the extrusion process known from the literature (see, for example, "Handbook of Thermoplastic Polyesters, Ed. S. Fakirov, Wiley-VCH, 2002", or in the chapter "Polyesters, Films" in the "Encyclopedia of Polymer Science and Engineering, Vol. 12, John Wiley & Sons, 1988").

The procedure in this process is that the melt corresponding to the film is extruded through a flat-film die, the resultant film is drawn off for solidification on one or more rollers, the film is then biaxially stretched (oriented), and the biaxially stretched film is heat-set and, if appropriate, also corona- or flame-treated on the surface layer intended for treatment.

The biaxial stretching (orientation) is generally carried out sequentially, preference being given to the sequential biaxial stretching process in which stretching first takes place longitudinally (in machine direction) and then transversely (perpendicularly to machine direction).

First, as is conventional in the extrusion process, the polymer or the polymer mixture for the film is compressed and plasticized in an extruder, and any additives intended for use may be present in the polymer or in the polymer mixture by this stage of the process. The melt is then simultaneously extruded through a flat-film die (slot die), and the extruded melt is drawn off on one or more cooled take-off rollers, whereupon it cools and solidifies to give a pre-film.

The biaxial stretching process is generally carried out sequentially. In this process, the pre-film is preferably first stretched longitudinally (i.e. in machine direction=MD) and then transversely (i.e. perpendicularly to machine direction=TD). This gives a spatial orientation of the polymer chains. The longitudinal stretching can be carried out with the aid of two rollers rotating at different speeds corresponding to the desired stretching ratio. For the transverse stretching, use is generally made of an appropriate tenter frame in which the two edges of the film are clamped and then drawn toward the two sides at an elevated temperature.

The temperature at which the stretching process is carried out can vary within a relatively wide range, and depends on the desired properties of the film. The longitudinal stretching is generally carried out at a temperature in the range from 80 to 130° C., and the transverse stretching in the range from 80 to 150° C. The longitudinal stretching ratio is generally in the range from 2.5:1 to 5:1, preferably from 3:1 to 4.5:1. The transverse stretching ratio is generally in the range from 3.0:1 to 5.0:1, preferably from 3.5:1 to 4.5:1.

In the heat-setting which follows, the film is kept for a period of from about 0.1 to 10 s at a temperature in the range from 150 to 250° C. The film is then wound up in the usual way.

After the biaxial stretching process, one or both surfaces of the film can be corona- or flame-treated by one of the known methods. The intensity of treatment is adjusted to give a surface tension in the range above 45 mN/m.

The film can also be coated in order to establish other desired properties. Typical coatings have adhesion-promoting, antistatic, slip-improving, hydrophilic, or release action. Clearly, it is possible to apply these additional layers to the film by way of in-line coating by means of aqueous dispersions, after the longitudinal stretching step and prior to the transverse stretching step.

During production of the inventive film, it is possible to reintroduce an amount in the range of up to 70% by weight, based on the total weight of the film, of the cut material (regrind) to the extrusion process, without any resultant significant adverse effect on the physical properties of the film, in particular its appearance.

The inventive film features defined optical properties and uniform roughness. Table 1 below gives the properties of the inventive films.

TABLE 1

| Film properties | Inventive range | Preferred | Particularly preferred | Unit | Test method |
|---|---|---|---|---|---|
| $SiO_2$ content | 0.25-<1.0 | 0.3-0.95 | 0.35-0.9 | % by wt. | |
| $TiO_2$ content | 0.25-<1.0 | 0.3-0.95 | 0.35-0.9 | % by wt. | |
| Highest elevation ($R_p$) | <4.0 | <3.5 | <3.0 | μm | |
| $SiO_2$ particle size ($d_{50}$) | 0.5-3.0 | 1.0-2.8 | 1.5-2.5 | μm | |
| $TiO_2$ particle size ($d_{50}$) | 0.02-0.6 | 0.05-0.5 | 0.1-0.3 | μm | |
| Transparency | 30-90 | 40-80 | 50-70 | % | ASTM-D 1003-00 |
| Gloss (60°) | 20-100 | 30-85 | 40-70 | | DIN 67 530 |
| Number of elevations >0.1 μm | 800-10000 | 1000-7500 | 1200-5000 | 1/mm² | |

The properties of the inventive films make them suitable for generating low-gloss, rough surfaces on various substrates, particularly if thin layers are first applied to the film. In this case, the low, uniform roughness gives homogeneous coating of the surface. Formation of cavities or thin areas in the coating is inhibited. Application as a transfer film and release film is particularly preferred.

The following test methods were utilized for the purposes of the present invention to characterize the raw materials and the films:

SV (Standard Viscosity)

Standard viscosity SV (DCA) is measured in dichloroacetic acid at 25° C. by a method based on DIN 53726. Intrinsic viscosity (IV) is calculated as follows from standard viscosity:

$$IV=[\eta]=6.907 \cdot 10^{-4} SV(DCA)+0.063096 [dl/g]$$

Gloss

Gloss was determined to DIN 67 530. Reflectance was measured, this being an optical value characteristic of a film surface. Based on the standards ASTM-D523-78 and ISO 2813, the angle of incidence was set at 600°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Measurement of Average Diameter $d_{50}$

Average diameter $d_{50}$ was determined by means of a laser on a Malvern Mastersizer by the standard method (examples of other test equipment being Horiba LA 500 or Sympathec Helos, which use the same principle of measurement). For this, the specimens were placed in a cell with water and these were then placed in the test equipment. The test procedure is automatic and also includes mathematical determination of the $d_{50}$ value.

The $d_{50}$ value here is determined in accordance with the definition from the (relative) cumulative particle size distribution curve: the point of intersection of the 50% ordinate value with the cumulative curve directly giving the desired $d_{50}$ value on the abscissa axis, as illustrated in more detail in FIG. 1.

Highest Elevation, Number of Elevations

The highest elevation on the film, and the number of elevations, were determined using a Wyko NT3300 white-light interferometry microscope from Veeco. For the test, a piece of film of size 10·10 cm was placed on the microscope stage and fixed by weighting with a metal ring of diameter 5 cm. An area of 0.9 mm·1.2 mm was tested at 5.1× magnification, and the separation of the individual test points was 1.65 µm. Any possible corrugation of the sample was filtered out. The maximum elevation $R_p$ is the distance from the calculated average level (average of all of the test points) to the highest point, the method being analogous to DIN 4762.

For determination of the number of elevations, these were defined as follows. An elevation or peak is a test point which is higher by at least 0.1 µm (in the z direction) than its four closest neighbors (in x direction and y direction), and which is higher than 20% of the height of the highest elevation. In each case, the averages from 5 individual measurements are stated.

Transparency

The polyester films are tested on a Hazegard Hazemeter XL-211 from BYK Gardner to ASTM-D1003-00.

Examples are used below for further illustration of the invention.

Example 1

Chips comprised of polyethylene terephthalate were dried and introduced into the extruder for the base layer (B). Extrusion followed by stepwise longitudinal and transverse orientation was used to produce a single-layer film whose total thickness was 100 µm.

Film, mixture comprised of:
75% by weight of polyethylene terephthalate whose SV value is 800
25% by weight of masterbatch comprised of 96% by weight of polyethylene terephthalate, 2.0% by weight of silica particles whose $d_{50}$ value is 2.0 µm, and 2.0% by weight of titanium dioxide whose $d_{50}$ value is 0.2 µm.

The production conditions in the individual steps of the process were:

| Extrusion: | Temperatures | 290° C. |
|---|---|---|
|  | Temperature of take-off roller | 30° C. |
| Longitudinal stretching: | Temperature: | 80-126° C. |
|  | Longitudinal stretching ratio: | 3.5 |
| Transverse stretching: | Temperature: | 80-135° C. |
|  | Transverse stretching ratio | 4.0 |

-continued

| Setting: | Temperature: | 230° C. |
|---|---|---|
|  | Period: | 3 s |

The film had the uniform low roughness required and the transparency required. Table 2 gives the properties achieved in the film.

Example 2

In comparison with Example 1, the following change was made to the constitution of the film:
Film, mixture comprised of:
60% by weight of polyethylene terephthalate whose SV value is 800
40% by weight of masterbatch comprised of 96% by weight of polyethylene terephthalate, 2.0% by weight of silica particles whose $d_{50}$ value is 2.0 µm, and 2.0% by weight of titanium dioxide whose $d_{50}$ value is 0.2 µm.

There was an increase in the roughness of the film in comparison with Example 1, and a reduction in the transparency.

Example 3

In comparison with Example 1, the following change was made to the constitution of the film:
Film, mixture comprised of:
75% by weight of polyethylene terephthalate whose SV value is 800
25% by weight of masterbatch comprised of 96% by weight of polyethylene terephthalate, 2.0% by weight of silica particles whose $d_{50}$ value is 2.5 µm, and 2.0% by weight of titanium dioxide whose $d_{50}$ value is 0.2 µm.

There was an increase in the roughness of the film in comparison with Example 1.

Comparative Example 1

The film was now produced with a particle system corresponding to EP-A-1 197 326, contrasting with Example 1. The examples of EP-A-1 197 326 have $SiO_2$ contents of from 2 to 3% by weight. A comparison was selected with a particle concentration which is closer to the subject matter of the present invention (1.0% by weight). The roughness of the film is too high.

Film, mixture comprised of:
80% by weight of polyethylene terephthalate whose SV value is 800
20% by weight of masterbatch comprised of 95% by weight of polyethylene terephthalate and 5.0% by weight of silica particles whose $d_{50}$ value is 3.4 µm.

TABLE 2

| Example | Film thickness [µm] | $SiO_2$ diameter in film [µm] | $SiO_2$ concentration [% by wt.] | $TiO_2$ diameter [µm] | $TiO_2$ concentration [% by wt.] | Number of peaks >0.1 µm | Highest elevation $R_p$ [µm] | Transparency [%] | Gloss at 60° |
|---|---|---|---|---|---|---|---|---|---|
| E 1 | 100 | 2 | 0.5 | 0.2 | 0.5 | 1900 | 2.78 | 61 | 65 |
| E 2 | 100 | 2 | 0.8 | 0.2 | 0.8 | 2400 | 2.91 | 48 | 49 |
| E 3 | 100 | 2.5 | 0.5 | 0.2 | 0.5 | 2000 | 3.12 | 62 | 51 |
| CE 1 | 100 | 3.4 | 1.0 | — | — | 2600 | 4.45 | 65 | 38 |

The invention claimed is:

1. A biaxially oriented polyester film comprising at least one base layer (B), said base layer comprising from about 0.25 to less than 1.0% by weight of $SiO_2$ and from about 0.25 to less than 1.0% by weight of $TiO_2$,
   wherein the size of the $SiO_2$ particles, $d_{50}$, is from about 1.0 μm to 3.0 μm
   and the size, $d_{50}$, of the $TiO_2$ particles is from about 0.02 to 0.5 μm
   and said films exhibit (i) a gloss, measured at 60°, ranging from 20 to 100, (ii) a highest elevation, $R_p$, of less than 4.0 microns and (iii) a number of surface elevations higher than 0.1 microns of from 800 to 10 000 per $mm^2$.

2. The polyester film as claimed in claim 1, wherein the highest elevation on the film, $R_p$, is smaller than about 3.5 μm.

3. The polyester film as claimed in claim 1, wherein the size of the $SiO_2$ particles, $d_{50}$, is from about 1.5 μm to 3.0 μm.

4. The polyester film as claimed in claim 1, wherein the $SiO_2$ is amorphous silica.

5. The polyester film as claimed in claim 1, wherein the $SiO_2$ particles have a ratio of length to width to height of 0.9-1.1:0.9-1.1:1.

6. The polyester film as claimed in claim 1, wherein the $TiO_2$ is rutile type or anatase type.

7. The polyester film as claimed in claim 1, wherein the size, $d_{50}$, of the $TiO_2$ particles is from about 0.02 to 0.4 μm.

8. The polyester film as claimed in claim 1, wherein the transparency of said film is in the range from about 30 to 90%.

9. The polyester film as claimed in claim 1, wherein the number of elevations higher than about 0.1 μm on the surface of the film is from about 1,000 to 7,500 per $mm^2$ and said film exhibits a gloss, measured at 60°, of from about 20 to 85.

10. The polyester film as claimed in claim 1, wherein said film exhibits a gloss, measured at 60°, of from about 20 to 85.

11. The film as claimed in claim 1, wherein said film is a single-layer film.

12. The film as claimed in claim 1, said film comprising no further particles other than catalyst precipitates.

13. The film as claimed in claim 1, said film having a thickness of from about 10 to 350 μm.

14. An industrial film comprising film as claimed in claim 1.

15. A separator film or transfer film comprising film as claimed in claim 1.

16. The polyester film as claimed in claim 1, wherein said base layer comprises from 0.50 to less than 1.0% by weight of $TiO_2$.

17. A release film comprising the film as claimed in claim 1, wherein said film exhibits
    (i) gloss, measured at 60°, ranging from 20 to 85, and
    (i) a highest elevation, Rp, of less than 3.5 microns,
    (iii) film surface elevations higher than 0.1 microns ranging from 1200 to 5000 per $mm^2$, and
    said film further comprises a release coating.

* * * * *